(12) United States Patent
Mukunthu

(10) Patent No.: US 9,406,074 B2
(45) Date of Patent: *Aug. 2, 2016

(54) FUNNEL ANALYSIS OF THE ADOPTION OF AN APPLICATION

(71) Applicant: MICROSOFT CORPORATION, Redmond, WA (US)

(72) Inventor: Deepak Mukunthu, Hyderabad (IN)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 3 days.

This patent is subject to a terminal disclaimer.

(21) Appl. No.: 14/538,808

(22) Filed: Nov. 12, 2014

(65) Prior Publication Data

US 2015/0095110 A1 Apr. 2, 2015

Related U.S. Application Data

(63) Continuation of application No. 13/182,461, filed on Jul. 14, 2011, now Pat. No. 8,892,727.

(51) Int. Cl.
| | |
|---|---|
| *G06F 15/173* | (2006.01) |
| *G06Q 30/02* | (2012.01) |
| *G06F 11/34* | (2006.01) |
| *H04L 29/08* | (2006.01) |
| *G06F 9/445* | (2006.01) |

(52) U.S. Cl.
CPC ........ *G06Q 30/0201* (2013.01); *G06F 11/3438* (2013.01); *G06F 11/3495* (2013.01); *H04L 67/22* (2013.01); *G06F 8/61* (2013.01)

(58) Field of Classification Search
CPC . G06F 11/3438; G06F 11/3495; G06F 21/00; G06F 8/61

USPC .................................. 709/223, 224; 370/252
See application file for complete search history.

(56) References Cited

U.S. PATENT DOCUMENTS

| | | | | |
|---|---|---|---|---|
| 6,389,538 B1 * | 5/2002 | Gruse | ..................... | G06F 21/10 705/51 |
| 6,587,837 B1 * | 7/2003 | Spagna | ................... | G06F 21/10 705/26.43 |
| 6,728,685 B1 * | 4/2004 | Ahluwalia | ............. | G06Q 30/06 705/26.5 |
| 6,982,708 B1 | 1/2006 | Mah et al. | | |
| 7,020,643 B2 | 3/2006 | Mah et al. | | |

(Continued)

OTHER PUBLICATIONS

Getting, Brian., "Web Analytics: Understanding Visitor Behavior", Retrieved at <<http://www.practicaleconnmerce.com/articles/122-Web-Analytics-Understanding-Visitor-Behavior>>, Jan. 1, 2006, pp. 3.

"Web Stats: Alternatives to Google", Retrieved at <<http://imimpact.com/web-stats-alternatives-to-google-analytics/>>, Mar. 3, 2011, pp. 12.

(Continued)

*Primary Examiner* — Phuoc Nguyen
*Assistant Examiner* — Davoud Zand
(74) *Attorney, Agent, or Firm* — Bryan Webster; Kate Drakos; Micky Minhas

(57) ABSTRACT

A funnel approach is used to analyze the behavior of users in adopting a software application offered through an electronic store. The electronic store may include an electronic store client module that provides a virtual electronic store front to users interested in licensing software applications offered by the electronic store. The electronic store may utilize a server that stores the applications store as well as collect instrumentation data representing user's actions in progressing through the various stages of adoption.

20 Claims, 7 Drawing Sheets

(56) References Cited

U.S. PATENT DOCUMENTS

| | | | |
|---|---|---|---|
| 7,035,925 B1 | 4/2006 | Nareddy et al. | |
| 7,752,026 B2* | 7/2010 | Gabele | G06F 17/5022 702/186 |
| 8,041,762 B2* | 10/2011 | Malone | G06F 17/30286 709/201 |
| 2002/0077998 A1* | 6/2002 | Andrews | G06Q 30/02 |
| 2002/0112048 A1* | 8/2002 | Gruyer | G06Q 30/02 709/224 |
| 2007/0027768 A1 | 2/2007 | Collins et al. | |
| 2008/0275980 A1* | 11/2008 | Hansen | G06Q 30/02 709/224 |
| 2009/0132307 A1* | 5/2009 | Messer | G06Q 10/10 705/1.1 |
| 2010/0257025 A1 | 10/2010 | Brocklebank | |
| 2012/0036245 A1 | 2/2012 | Dare et al. | |

OTHER PUBLICATIONS

Brad., "How to view Google Analytics Funnels for Segmented Data", Retrieved at <<http://certifiedknowledge.org/blog/how-to-view-google-analytics-funnels-for-segmented-data/>>, Retrieved Date: Apr. 19, 2011, pp. 6.

"HitsLink Real-time Web Analytics Review", Retrieved at <<http://www.livewebanalysis.com/hitslink-review/>>, Mar. 3, 2010, pp. 6.

"Getting Started with Yahoo! Web Analytics", Retrieved at <<http://help.yahoo.com/l/us/yahoo/ywa/faqs/overview/index.pdf>>, Retrieved Date: Apr. 19, 2011, pp. 3.

"Visualize Visitor Behavior using Dynamic Funnel Analysis", Retrieved at <<http://www.hitslink.com/whitepapers/funnel-analysis.pdf>>, Retrieved Date: Apr. 19, 2011, pp. 1-7.

* cited by examiner

FUNNEL ANALYSIS OF THE ADOPTION OF AN APPLICATION

CROSS REFERENCE TO RELATED APPLICATIONS

This is a continuation of application Ser. No. 13/182,461, U.S. Pat. No. 8,892,727, filed on Jul. 14, 2011, and entitled, "FUNNEL ANALYSIS OF THE ADOPTION OF AN APPLICATION", the entirety of which is incorporated by reference.

BACKGROUND

The development of a software application involves a considerable amount of effort which may involve product definition, software design, programming, testing, product deployment, marketing, maintenance, and so on. Feedback from users utilizing the software application is important for the widespread use or adoption of the software application. At times, the software or product development team may lack insight into an user's satisfaction and experience with the application once the application has been deployed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An electronic store may be used to license users a variety of software applications. The electronic store may include a mechanism to track a user's behavior during the adoption of a software application. A funnel may be used to identify the stages in the adoption process that are tracked. The electronic store tracks the user's actions through the hierarchical-ordered path which may then be viewed visually in the form of a funnel report. The funnel report provides a software or product developer with a visual analysis of the user's activity at each stage. In this manner, the developer can quickly ascertain any bottlenecks preventing widespread adoption of the application and possible remedial actions.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Various embodiments are directed to a technology for automatically analyzing the adoption of software applications provided from an electronic store. The adoption of a software application involves several stages starting with advertising the software application to users through users purchasing goods and/or services offered by the application. Information regarding how users act at each stage provides a software and/or product developer with crucial information that may be used to improve the performance, marketability, user experience, and ultimately the widespread adoption of the software application in the marketplace.

An electronic store may be used to license users a variety of software applications. The software applications or applications may be any type of executable instructions such as programs, procedures, modules, applications, code segments, program stacks, middleware, firmware, methods, routines, and so on. The applications may be operating systems, office suites, enterprise software, graphics software, video games, computer games, codecs, media players, accounting software, and so on. The electronic store may be composed of software components residing on a client machine and software components that reside on an electronic store server. An electronic store client module may be provided in a user's client machine to provide an electronic store front. The electronic store server may be used to download the software applications to the users as well as perform other functions and services.

In an embodiment, a funnel may be used to identify the stages in the adoption process that are tracked. A funnel represents a hierarchical-ordered path of actions taken by a user in the adoption of an application. The electronic store server stores instrumentation data representing users' actions through the hierarchical-ordered path which may then be viewed visually in the form of a funnel report. The funnel report provides a software or product developer with a visual analysis of users' activity at each stage. In this manner, the developer can quickly ascertain any bottlenecks preventing widespread adoption of the application and possible remedial actions.

Figure 1:
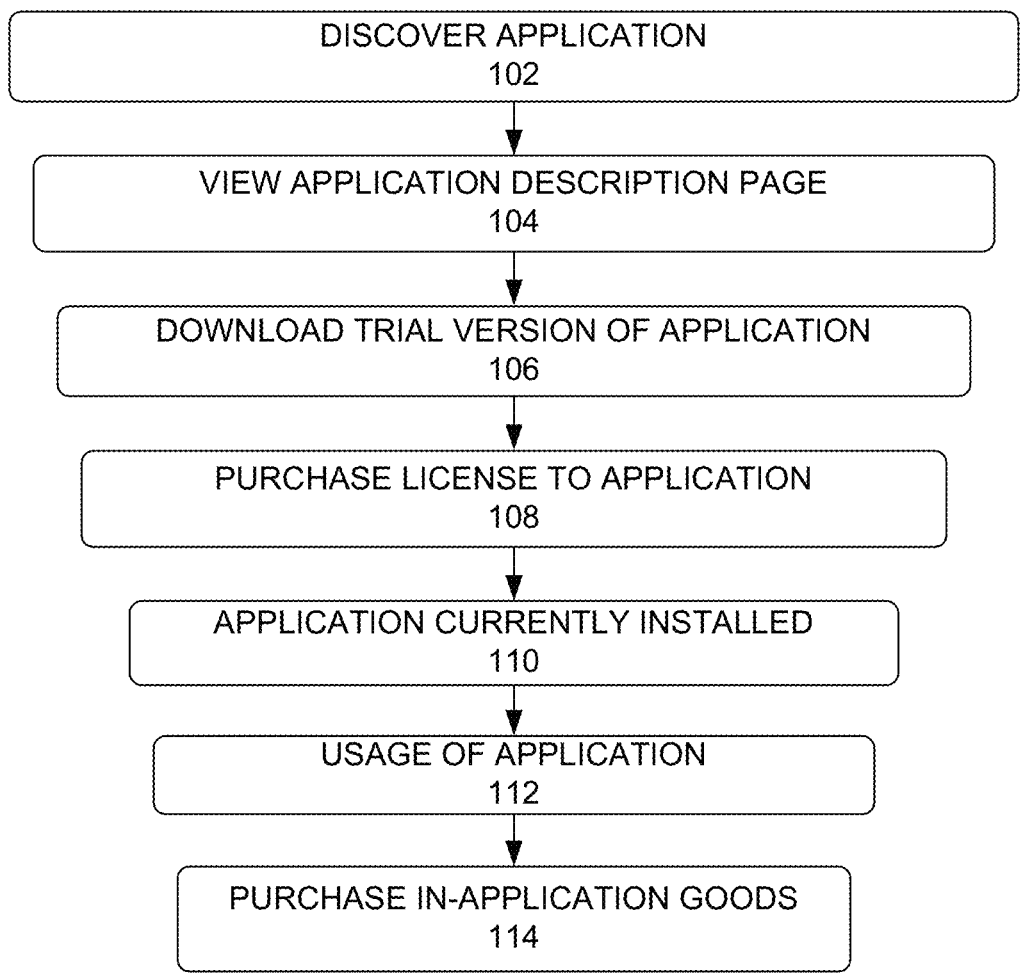
FIG. 1 illustrates an exemplary funnel showing the various stages of the adoption of an application.
Figure 2:
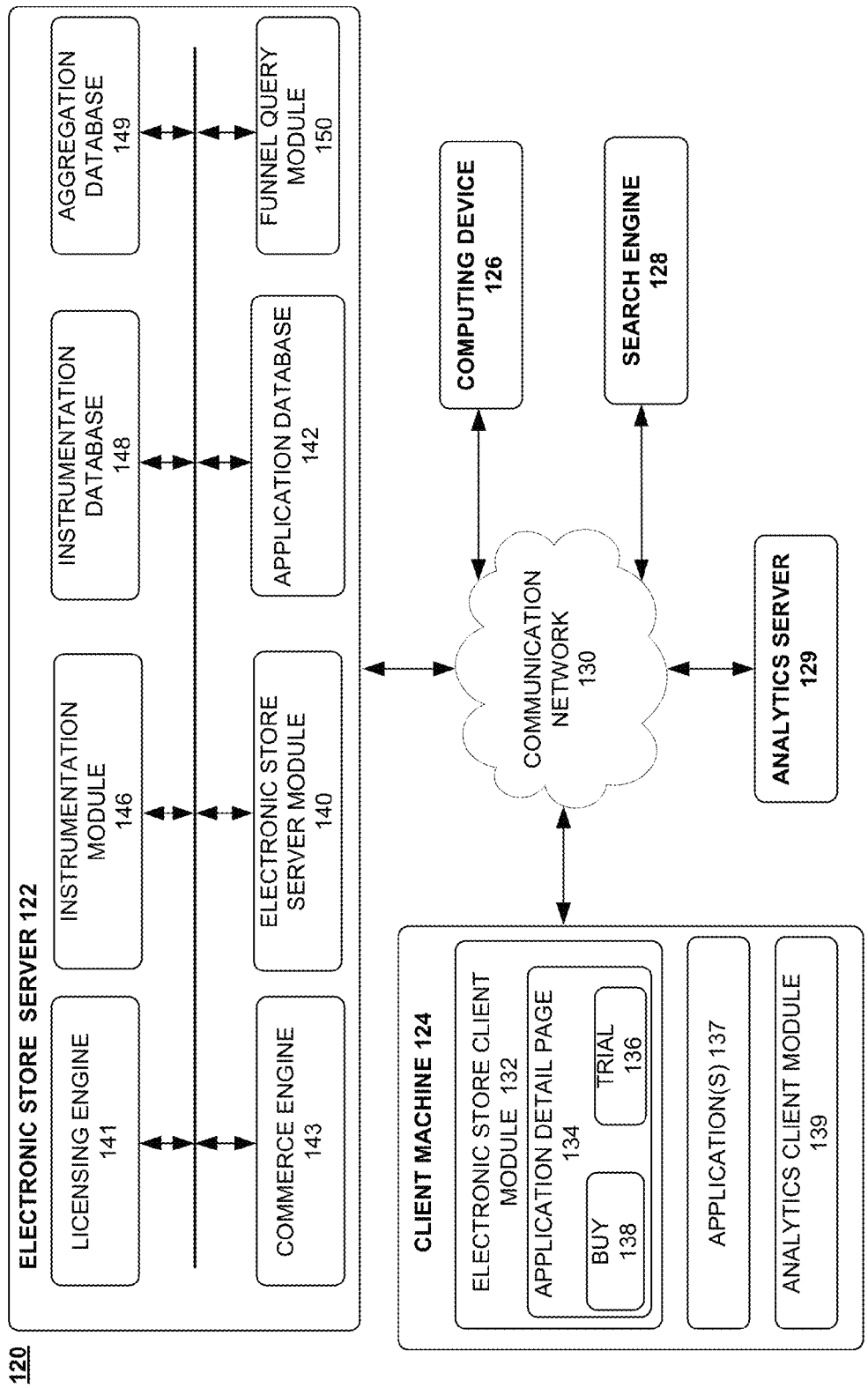
FIG. 2 is a block diagram of an exemplary system for facilitating a funnel analysis of the adoption of an application.

FIG. 1 shows an exemplary funnel 100 focused on seven specific stages that occur during application adoption. Although FIG. 1 shows seven stages in the application adoption process, it should be appreciated that the funnel 100 can include more or less stages in alternate configurations for a desired implementation.

In this example, the first stage 102 may be the stage where the application is discovered through an advertisement or reference in a referral source. A referral source may be any web-accessible source that advertises or references an application that may be licensed from the electronic store. A referral source may be the electronic store or a web server or search engine such as Bing.com, Google.com, or the like. The first stage 102 may represent the number of times the application is listed in search results from any referral source.

The second stage 104 may represent accesses made by users to the electronic store's application detail page. An application detail page describes the application and may contain information pertaining to the application's features, operating requirements, performance characteristics, and so on. The application detail page may be a page displayed by the electronic store client module 132 and/or may be a web page that is accessible from a web server or search engine.

The third stage 106 may represent the users who have downloaded a trial version of an application from the electronic store's application detail page. The fourth stage 108 may represent the users who purchased a license of the application. The fifth stage 110 may track the users who have currently installed the application after having purchased a license to the application. The fifth stage tracks the current installed base of users as the difference between the number of users who have purchased a license to the application and the number of users who have uninstalled the application. As such, the fifth stage tracks the users who have uninstalled the application in order to determine the number of users who have currently installed the application.

The sixth stage 112 may track how many users regularly use the application. The seventh stage 114 may track how may transactions made by the users to goods and/or services that are offered by the application. An application may contain offers for goods or services that a user may purchase during the execution of the application.

Referring to FIG. 1, there is shown a system 120 having an electronic store server 122, a client machine 124, a computing device 126, a search engine 128, and an analytics server 129, all coupled to a communications network 130. The electronic store server 122 is part of the electronic store and provides the applications that are offered to users as well as perform other functions and services described in more detail below. The client machine 124 contains an electronic store client module 132 that provides an electronic store front to a user. The computing device 126 may be used by a software or product developer to query the server for funnel reports. The search engine 128 provides a user with the capability to search for software applications such as those offered from the electronic store. The analytics server 129 monitors and tracks the usage of the applications by a user. The communications network 130 enables the electronic store server 122, client machine 124, computing device 126, search engine 128, and analytics server 129 to communicate with each other.

The electronic store server 122, the client machine 124, the computing device 126, the search engine 128, and analytics server 129 may be any type of electronic device capable of executing a sequence of instructions in a defined manner, such as, without limitation, a wireless device, a personal digital assistant, a mobile computing device, a smart phone, a cellular telephone, a handset, a pager, a messaging device, a computer, a personal computer, a desktop computer, a laptop computer, a server, a web server, a server farm, a workstation, a notebook, laptop, a tablet PC, and any combination thereof. The server 120, client machine 124, the computing device 126, search engine 128, and analytics server 129 may be a general purpose computing device or a customized computing device, such as, a multi-processor system, a single processor system, and a customized hardware device.

The electronic store server 122, the client machine 124, the computing device 126, the search engine 128, and analytics server 129 are in communication with each other through a communication network 126 that may include any one or multiple types of wired and/or wireless communications media which may involve the uni-directional or bi-directional exchange of information.

The client machine 124 may be used by an user to access the electronic store. The client machine 124 may include an electronic store client module 132, an application 137, and an analytics client module 139. The electronic store client module 132 acts as a virtual store front for the electronic store. The electronic store client module 132 may be a thin client software component that interacts with the electronic store server 122. The electronic store client module 132 interacts with the electronic store server 122 to offer software applications to a user and to assist in the tracking of the adoption of the applications offered through the electronic store.

A user using the electronic store client module 132 may request an application detail page 134 that contains more descriptive information pertaining to an application 137. The application detail page 134 may be stored as part of the electronic store client module 132 in the client machine. Alternatively, the application detail page may be a web page downloaded from the electronic store server 122. The application detail page 134 may contain a trial option 136 and/or a buy option 138. The buy option 138 enables a user to license the application and the trial option 136 enables a user to use the application 137 for a limited time frame thereby obtaining a trial license.

The electronic store server 122 may include an electronic store server module 140, a licensing engine 141, an application database 142, a commerce engine 143, an instrumentation module 146, an instrumentation database 148, an aggregation database 149, and a funnel query module 150. The electronic store server module 140 interacts with the electronic store client module 132 to download applications to the user and to store instrumentation data. The licensing engine 141 tracks the licenses sold for each application and monitors each user's compliance with the license terms. The application database 142 may store the applications offered through the electronic store which may be downloaded from the application database 142 to a user at a client machine. A commerce engine 143 may be used to facilitate the sale and purchase of goods and/or services offered by an application, otherwise referred to herein as in-application goods and services.

An instrumentation module 146 collects the instrumentation data which is stored in the instrumentation database 148. An aggregation database 149 may be used to store data that is aggregated in accordance with a desired configuration. The funnel query module 150 interacts with a developer through the computing device 126 to prepare and generate funnel reports. The funnel query module 150 queries data from the aggregation data base 149. In an embodiment, an aggregation module (not shown) may be used to, on a periodic basis, read data from the instrumentation database 148, aggregate and store the aggregated data into the aggregation data base 149.

Although the electronic store server 122 has a limited number of elements in a certain configuration, it should be appreciated that electronic store server 122 may include more or less elements in alternate configurations. For example, the components of electronic store server 122 may be arranged in a multiple server configuration where each server may perform the function of one or more of the components of electronic store server 122. There may be a separate licensing server providing the services of the licensing engine, a separate commerce server providing the services of the commerce engine, and so forth. The embodiments are not limited in this manner.

A search engine 128 may be a computing device that searches for information on the Internet. The search engine 128 may be implemented as a web server, such as bing.com, google.com, yahoo.com, and the like. The search engine 128 may be used to track how often an application appears in search results.

The analytics server 129 interacts with the analytics client module 139 to collect anonymous data pertaining to the usage of the applications by a user. Each analytics client module 139 sends the usage data to the analytics server 129 on a regular basis and the analytics server 129 consolidates this usage data and forwards it to the electronic store server 122.

Figure 3:
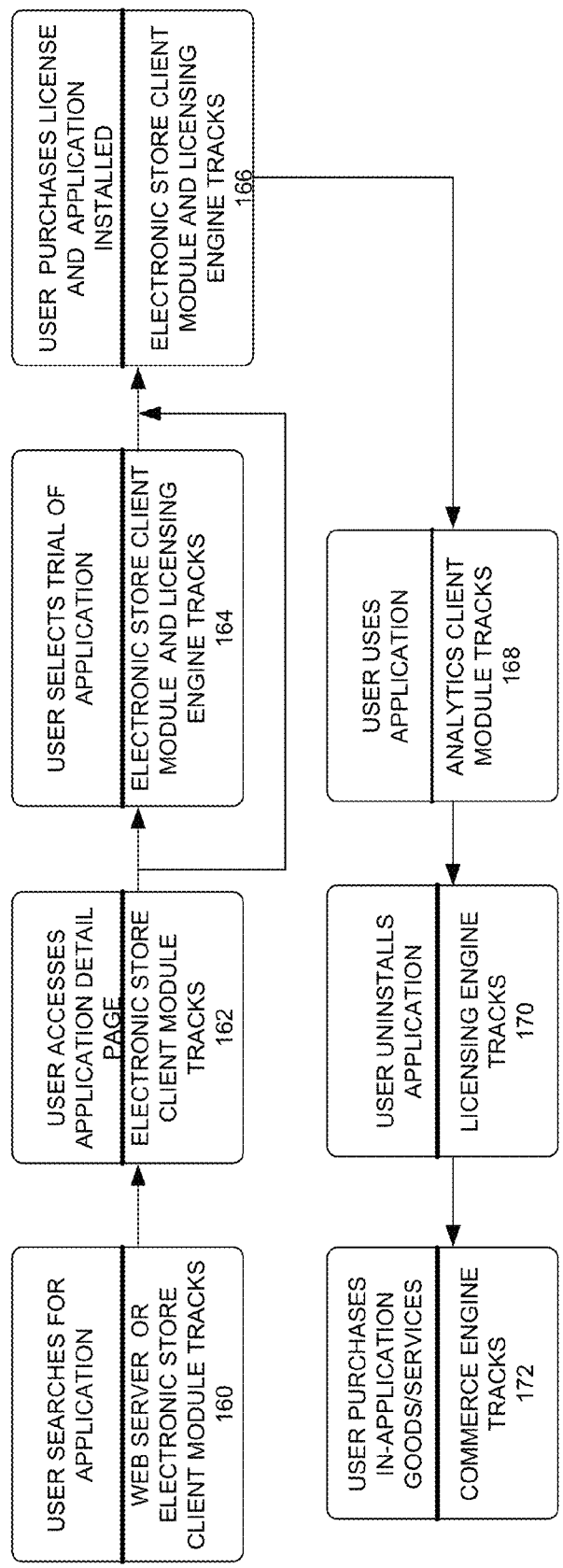
FIG. 3 illustrates an exemplary process flow for facilitating a funnel analysis of the adoption of an application.

FIG. 3 illustrates an exemplary process flow for system 120. In an embodiment, a user may utilize the electronic store client module 132 to browse and/or search for applications offered by the electronic store (block 160). The electronic store client module 132 may track the references to each application that appear in a user's search results (block 160). Alternatively, the user may utilize a search engine 128 to search for applications that are offered by the electronic store. The search engine 128 may track the references to each application that appears in a user's search results which may be provided to the electronic store server module 140 (block 160).

The user may then browse the application detail page 134 pertaining to a particular application (block 162). The application detail page 134 may describe the application and contain technical specifications, operating requirements, and the like. The electronic store client module 132 may track the application detail pages that a user browses (block 162).

An application detail page 134 may include a trial option 136 for a user to try the application for limited time duration or for limited functionality. The trial option may be also be for limited functionality with no time duration. A user may select the trial option 136 which may allow the user to obtain a trial license to the application for a limited time period or for limited functionality (block 164). The electronic store client module 132 may initiate the trial by contacting the electronic store server module 140 to download a copy of the application. In addition, the electronic store server module 140 may engage the licensing engine 141 to activate and monitor the trial license of the application (block 164).

The application detail page 134 may include a buy option 138 for a user to purchase a license to the application (block 166). The license may be for a single user license and/or a multiple user license. The electronic store client module 132 may initiate the purchase by contacting the electronic store server module 140 to download a copy of the application 137. The electronic store client module 132 receives the downloaded application which is then installed on the user's client machine 124. The electronic store server module 140 may engage the licensing engine 141 to activate and monitor the license (block 166).

The data tracked by the electronic store client module 162, otherwise referred to as the instrumentation data, may be forwarded to the electronic store server 122 and processed by the instrumentation module 146 and stored in the instrumentation database 148. The instrumentation data may be forwarded periodically at random times, such as during idle times, or routinely, such as prior to the user's logging off the client machine 124 or from the electronic store.

An analytics client module 139 may be used to track the user's usage of an application (block 168). The analytics client module 139 may be part of the operating system or a standalone application or software component. In an embodiment, the analytics client module 139 may be a thin client module that interacts with an analytics server 129. The analytics client module may track the frequency that a user uses an application, the length of time that the application is used, the times that the application is used, and so on. The analytics client module 139 interacts with the analytics server 129 to track and collect this usage data. The analytics server 129 provides the tracked usage data to the electronic store server 122 for storage in the instrumentation database 148 through the instrumentation module 146. In an embodiment, the analytics client module 139 and the analytics server 129 may be the Reliability Analysis Component of the Microsoft Windows Server® 2008 product.

At any point after the application is downloaded to the client machine 124, the user may uninstall the application (block 170). The licensing engine 141 periodically monitors each user's compliance with the license terms of an application. The licensing engine 141 may detect that the application was uninstalled by the user which is tracked by the instrumentation module 146 and this data may be stored in the instrumentation database 148.

An application 137 may offer goods and services for purchase by a user (block 172). The application interacts with the commerce engine 143 to facilitate the purchase of these goods and services (block 172). The commerce engine 143 may track the purchases made by users of an application and the tracked purchase data is provided to the instrumentation module 146 and stored in the instrumentation database 148 (block 172).

Attention now turns to a further discussion of operations for the embodiments with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

Figure 4:
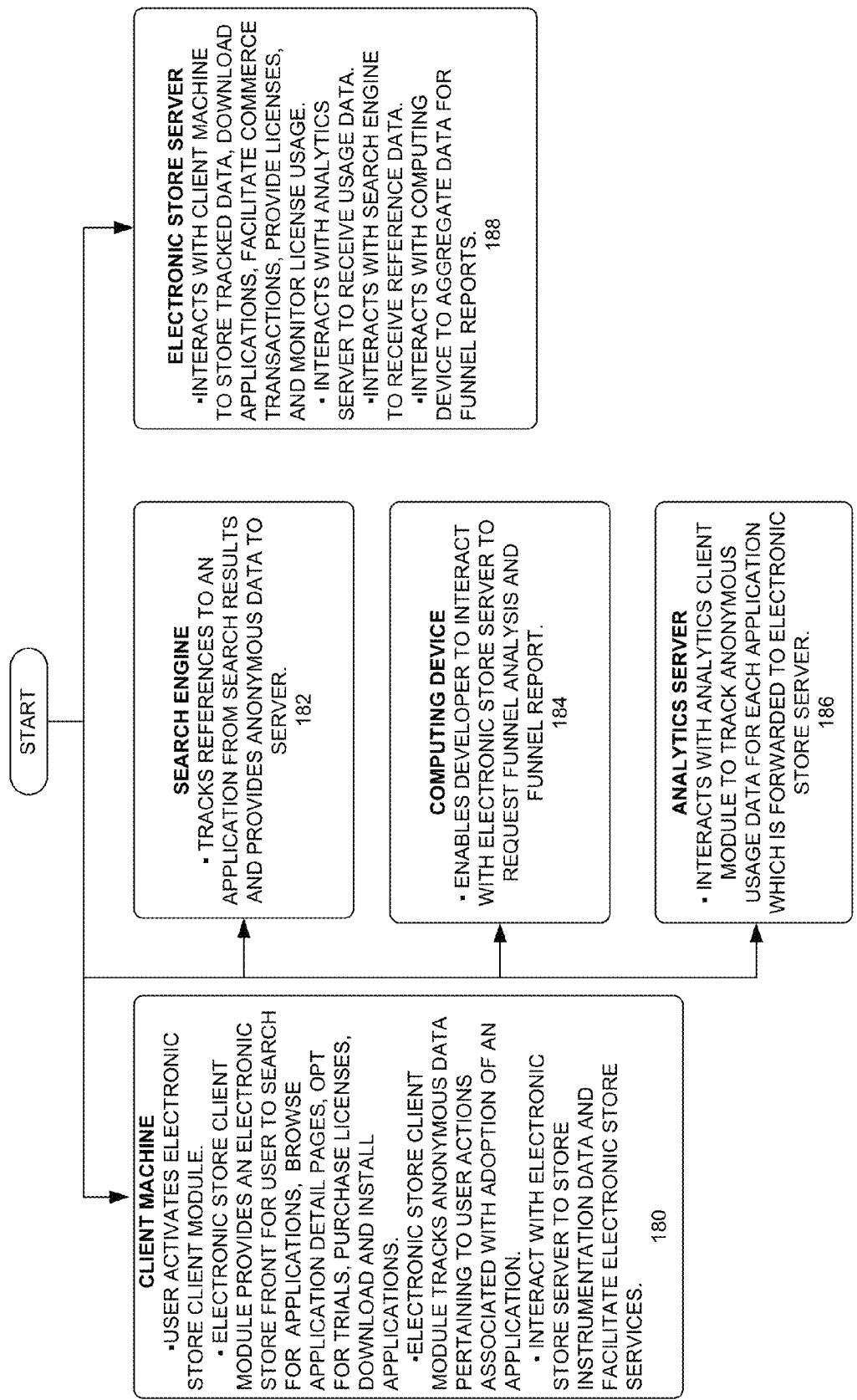
FIG. 4 is a flow chart illustrating an exemplary method for facilitating a funnel analysis of the adoption of an application.

FIG. 4 illustrates a flow chart of an exemplary method for automatically performing a funnel analysis of an application's adoption. In an embodiment, the client machine 124, the computing device 126, the electronic store server 122, the search engine 128 and the analytics server 129 may operate in parallel. It should be noted that the method may be representative of some or all of the operations executed by one or more embodiments described herein and that the method can include more or less operations or operate in a different order than that which is described in FIG. 4.

At the client machine 124 (block 180), a user may activate the electronic store (block 180). In an embodiment, the electronic store may be part of another application, such as an operating system, an email service, a Windows Live® service, and so forth. As such, the electronic store client module 132 may already be loaded onto the user's client machine 124 or alternatively may be downloaded upon activation of an associated service (e.g., Windows Live®). The user may activate the electronic store through the associated service or application.

In another embodiment, the user may register directly with the electronic store using a web browser that accesses the electronic store server 122. After registration with the electronic store server 122, the electronic store server 122 may download the electronic store client module 132 to the client machine 124. The user interacts thereafter through the electronic store client module 132. The electronic store client module 132 may generate one or more menus that enable a user to utilize the electronic store.

In an embodiment, access to the electronic store may be facilitated through a user account. When registering for the user account, the user may provide consumer data such as gender, age, and geographic region, and the like. Anonymous consumer data may be used to study the behavior of the user with respect to a particular application.

The user may utilize the electronic store client module 132 to search for applications, browse application detail pages, opt for trials of an application, purchase licenses to an application, download and install an application, uninstall an application, and use the application (block 180). The electronic store client module 132 tracks certain user actions associated with the user's adoption of an application which are forwarded to the electronic store server 122 (block 180).

The search engine 128 tracks references to applications 137 that are offered through the electronic store from various user search results (block 182). The search engine 128 forwards the tracked references to the electronic store server 122 upon request, routinely, or as desired.

The computing device 126 may be used by a software developer, product developer, market analyst or other party to request a funnel analysis of the adoption of an application (block 184). The request may specify that the instrumentation data that the funnel should include, the particular stages of the funnel that are of interest, and any other configuration that is of interest to the developer. For example, the request may specify that the funnel analysis be made respect to users of a particular age group, within a particular geographic region, and so on.

The analytics server 129 interacts with each analytics client module 139 on each client machine 124 to track usage of the applications executing on the client machine 124 (block 186). The analytics server 129 consolidates the anonymous usage data and forwards the data to the electronic store server 122.

The electronic store server 122 interacts with the client machine 124 to download applications to the electronic store client module 132, to facilitate e-commerce transactions, to license applications, and to monitor the license usage (block 188). The electronic store server 122 interacts with the electronic store client module 132 through an electronic store server module 140. The electronic store server module 140 receives instrumentation data and utilizes the instrumentation module 146 to store the instrumentation data in the instrumentation database 148. The electronic store server module 140 utilizes the commerce engine 143 to facilitate transactions for goods and/or services offered by an application. The electronic store server module 140 utilizes the licensing engine 141 to track the licenses granted to each user of an application and to monitor each user's compliance with such licenses.

The electronic store server 122 interacts with the analytics server 129 to store the tracked usage data. The electronic store server module 140 receives the tracked usage data which the instrumentation module 146 stores in the instrumentation database 148. The electronic store server 122 interacts with the search engine 128 to store the tracked references of an application that appear in search results. The electronic store server module 140 receives the tracked reference data which the instrumentation module 146 stores in the instrumentation database 148. The electronic store server 122 interacts with a developer, through the computing device 126, to receive requests for a funnel analysis of an application.

Figure 5:
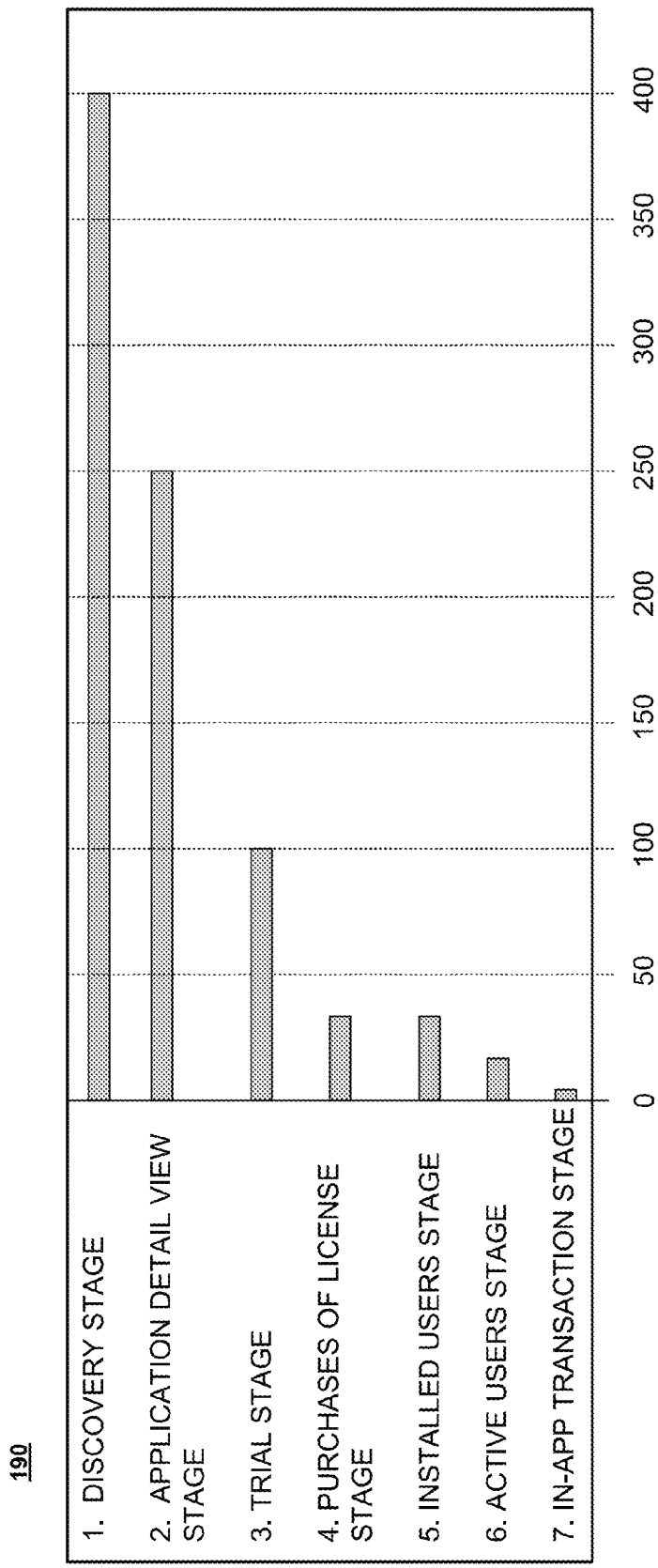
FIG. 5 is an exemplary funnel report.

FIG. 5 illustrates an exemplary funnel report 190 showing the adoption of the application with respect to the stages indentified in the funnel. As shown in FIG. 5, each of the seven stages is listed in hierarchical order on the horizontal axis and the number of users is shown on the vertical axis. The funnel report 190 illustrates the progression of the adoption of the application. Initially, the application was referenced in referral sources to 400 users. Only 250 users viewed the application detail page and of those 250 users only 100 opted for a trial version of the application. Approximately 35 users purchased a license to the application and installed the application. Approximately 20 users actively use the application and only a handful of users have purchased goods and services offered from within the application.

The funnel report 190 provides a developer of the software application with a view of the user's behavior in adopting the application in order to identify any problems affecting the widespread adoption of the application. For example, if the funnel report 190 shows that references to the application in the discovery stage is low (i.e. first stage), then the developer may focus on marketing the application more at the various referral sources. If the funnel report 190 shows that the number of users viewing an application detail page 134 is low (i.e., second stage), then the developer may focus additional efforts on improving the path from the referral sources to the application detail page 134.

If the funnel report 190 shows that the number of trials or purchases of licenses to the application is low, then the developer may improve the application detail page 134. If the funnel report 190 shows a large number of users are opting to try the application but do not subsequently purchase a license to the application, then the application itself may be an issue. If the funnel report 190 shows that a large number of purchasers of a license are not installing the application, then the developer may focus additional efforts on improving the application itself. Likewise, if the funnel report 190 shows that a large number of installers are not using the application, it may be due to the quality of the features in the application or that the application may be outdated which the developer may improve upon. If the funnel report 190 shows that the number of transactions made to application offerings is low, the developer may consider reducing the cost of the offerings or consider different offerings.

Figure 6:
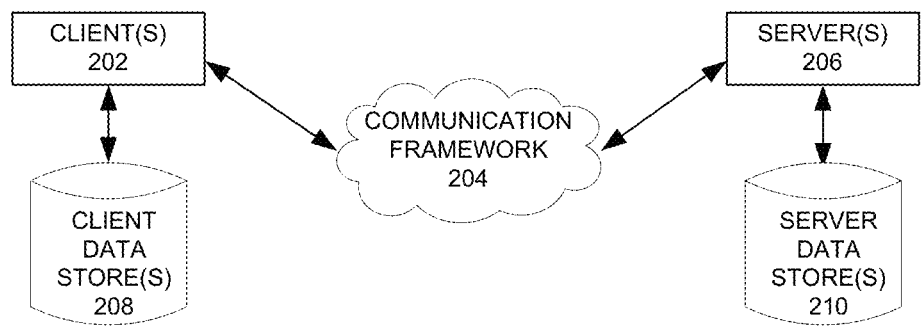
FIG. 6 is a block diagram illustrating an exemplary operating environment.

Attention now turns to a description of an exemplary operating environment. Referring now to FIG. 6, there is shown a schematic block diagram of an exemplary operating environment 200. The operating environment 200 may include one or more client(s) 202 in communication through a communications framework 204 with one or more server(s) 206. In an embodiment, a client 202 may be configured to use documents or data stored in a client data store 206 and the client 202 may be implemented as the client machine 124. In an embodiment, a server 206 may be configured to use documents or data stored in a server data store 210. In an embodiment, the server 206 may receive requests from one or more clients 202 to access the documents and data stored therein. In an embodiment, the server 206 may be implemented as the electronic store server 122 of the electronic store.

A client 202 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A client 202 may also be embodied as a software module having instructions that execute in a single execution path, multiple concurrent execution paths (e.g., thread, process, etc.), or in any other manner A server 206 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A server 206 may also be embodied as a software module having instructions that execute in a single execution path, multiple concurrent execution paths (e.g., thread, process, etc.), or in any other manner The communications framework 204 facilitates communications between the client 202 and the server 206. The communications framework 204 may embody any type of communications medium, such as wired or wireless networks, utilizing any communication protocol.

Figure 7:
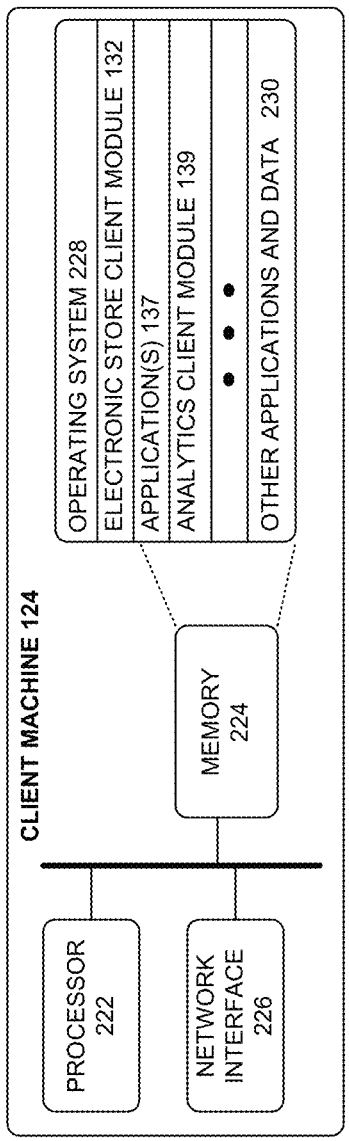
FIG. 7 is a block diagram illustrating an exemplary client machine.

Referring to FIG. 7, a client machine 124 may have a processor 222, a memory 224, and a network interface 226. The processor 222 may be any commercially available processor and may include dual microprocessors and multi-processor architectures. The network interface 226 facilitates wired or wireless communications between the client machine 124 and a communications network 130 in order to provide a communications path between the client machine 124 and the electronic store server 122.

The memory 224 may be any computer-readable storage media or computer-readable media that may store processor-executable instructions, procedures, applications, and data. The computer-readable media does not pertain to propagated signals, such as a modulated data signal transmitted through a carrier wave. It may be any type of memory device (e.g., random access memory, read-only memory, etc.), magnetic storage, volatile storage, non-volatile storage, optical storage, DVD, CD, floppy drive, disk drive, flash memory, and the like. The memory 224 may also include one or more external storage devices or remotely located storage devices. The memory 224 may contain instructions and data as follows:

an operating system 228;
   an electronic store client module 132;
   one or more applications 137;
   an analytics client module 139; and
   various other applications and data 230.

Figure 8:
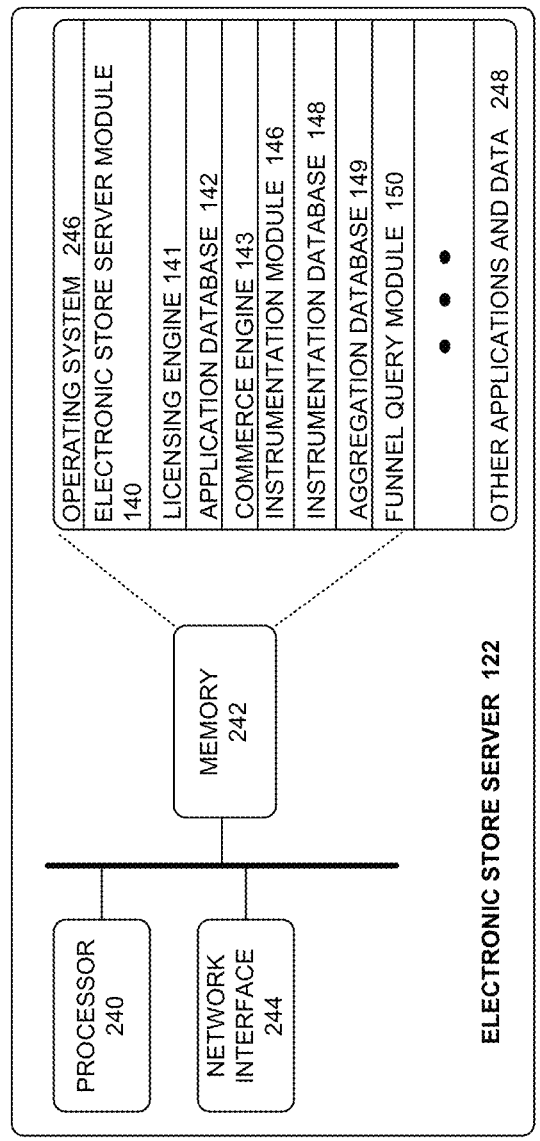
FIG. 8 is a block diagram illustrating an exemplary electronic store server.

Referring to FIG. 8, an electronic store server 122 may have a processor 240, a memory 242, and a network interface 246. The processor 240 may be any commercially available processor and may include dual microprocessors and multi-processor architectures. The network interface 244 facilitates wired or wireless communications between the electronic store server 122 and a communications network 130 in order to provide a communications path between a client machine 124 and the electronic store server 122.

The memory 242 may be any computer-readable storage media or computer-readable media that may store processor-executable instructions, procedures, applications, and data. The computer-readable media does not pertain to propagated signals, such as a modulated data signal transmitted through a carrier wave. It may be any type of memory device (e.g., random access memory, read-only memory, etc.), magnetic storage, volatile storage, non-volatile storage, optical storage, DVD, CD, floppy drive, disk drive, flash memory, and the like. The memory 242 may also include one or more external storage devices or remotely located storage devices. The memory 242 may contain instructions and data as follows:

an operating system 246;
   an electronic store server module 140;
   a licensing engine 141;
   application database 142;
   commerce engine 143;
   instrumentation module 146;
   instrumentation database 148;
   an aggregation database 149;
   funnel query module 150; and
   other applications and data 248.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

For example, various embodiments of the system may be implemented using hardware elements, software elements, or a combination of both. Examples of hardware elements may include devices, components, processors, microprocessors, circuits, circuit elements, integrated circuits, application specific integrated circuits, programmable logic devices, digital signal processors, field programmable gate arrays, memory units, logic gates and so forth. Examples of software elements may include software components, programs, applications, computer programs, application programs, system programs, machine programs, operating system software, middleware, firmware, software modules, routines, subroutines, functions, methods, procedures, software interfaces, application program interfaces, instruction sets, computing code, code segments, and any combination thereof. Determining whether an embodiment is implemented using hardware elements and/or software elements may vary in accordance with any number of factors, such as desired computational rate, power levels, bandwidth, computing time, load balance, memory resources, data bus speeds and other design or performance constraints, as desired for a given implementation.

Some embodiments may comprise a storage medium to store instructions or logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software components, such as programs, procedures, module, applications, code segments, program stacks, middleware, firmware, methods, routines, and so on. In an embodiment, for example, a computer-readable storage medium may store executable computer program instructions that, when executed by a processor, cause the processor to perform methods and/or operations in accordance with the described embodiments. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

In various embodiments, the system described herein may comprise a computer-implemented system having multiple components, programs, procedures, modules. As used herein these terms are intended to refer to a computer-related entity, comprising either hardware, a combination of hardware and software, or software. For example, a component may be implemented as a process running on a processor, a hard disk drive, multiple storage drives (of optical and/or magnetic storage medium), an object, an executable, a thread of execution, a program, and/or a computer. By way of illustration, both an application running on a server and the server may be a component. One or more components may reside within a process and/or thread of execution, and a component may be localized on one computer and/or distributed between two or more computers as desired for a given implementation. The embodiments are not limited in this manner Although the electronic store described herein has been described to providing software applications, the technology may be used to provide other types of electronic data, such as without limitation, digital video, digital music, e-books, and the like.

What is claimed:

1. A method implemented on a computing device, the method comprising:
   distributing a first module to at least one or more users, the first module allows the at least one or more users to interact with an electronic store;
   offering at least one application for distribution to the at least one or more users from the electronic store;
   receiving a first set of instrumentation data associated with user actions from the at least one or more users, the first set of instrumentation data pertaining to user actions in adoption of the at least one application tracked from the first module; and
   aggregating the first instrumentation data into a funnel, the funnel used to represent a hierarchical-ordered path of actions taken by multiple users in adoption of the at least one application, the funnel including a plurality of stages, each of the tracked user actions associated with at least one stage of the funnel.

2. The method of claim 1, further comprising:
   receiving a second set of instrumentation data that pertains to user actions incurred during usage of the application; and
   aggregating the second set of instrumentation data into the funnel, wherein each user action associated in the second set of instrumentation data is associated with at least one stage of the funnel.

3. The method of claim 1, further comprising:
   monitoring usage of licenses associated with the application; and
   aggregating the usage of licenses associated with the application into the funnel.

4. The method of claim 1, further comprising:
   receiving a third set of instrumentation data from a search engine, the third set of instrumentation data pertaining to references associated with the application from search results; and
   aggregating the third set of instrumentation data into the funnel.

5. The method of claim 1, further comprising:
   monitoring purchases of goods and services associated with the application; and
   aggregating the purchases of the good and services into the funnel.

6. The method of claim 1, wherein the plurality of stages includes one or more of a discovery state, an application detail view stage, a trial stage, a purchase of license stage, an installed users stage, active users stage and in-app transaction stage.

7. The method of claim 1, further comprising:
   formulating a funnel report configured in response to a request for one or more of the stages.

8. A system, comprising:
   at least one processor and a memory, the memory including:
      an application for distribution to at least one user;
      a first module that interacts with the at least one user to service requests pertaining to the application from the at least one user;
      a second module that obtains a first set of tracked data associated with user actions performed in adoption of the application, the first set of tracked data analyzed to formulate a funnel, the funnel represents a hierarchical-ordered path of actions taken by multiple users in adoption of the application, the funnel including one or more stages, each user action associated with at least one stage of a funnel; and
      a third module that aggregates the first set of tracked data into a funnel report, the funnel report aggregating the first set of tracked data in accordance with the stages for all users of the application.

9. The system of claim 8, further comprising:
   a funnel query module that obtains a request for a specific configuration of a select funnel report.

10. The system of claim 8, further comprising:
    a licensing engine that tracks user actions in uninstalling the application;
    wherein the third module aggregates the user actions in uninstalling the application into the funnel report.

11. The system of claim 8, wherein the first module distributes a client module that tracks the user actions performed in adoption of the application from a client device associated with the at least one user.

12. The system of claim 8, wherein the tracked data is obtained from an analytic server in communication with the at least one user.

13. The system of claim 8, wherein the second module receives a second set of tracked data that is associated with references to the application from a referral source, wherein the third module aggregates the second set of tracked data in the funnel report.

14. The system of claim 8, wherein the stages of the funnel report includes one or more of:
    user actions taken by while viewing an application detail page associated with the application;
    user actions taken in opting for a trial of the application;
    user actions taken in purchasing a license to the application;
    user actions taken in installing the application;
    user actions taken in uninstalling the application; and
    user actions taken in purchasing goods or service offered during execution of the application.

15. A device comprising:
    at least one processor and a memory;
    the at least one processor configured to:
    configure an electronic store to license one or more applications for distribution to one or more external users;
    distribute an electronic client module to the one or more external users;
    receive from the one or more external users instrumentation data including user actions made with the electronic store and in adoption of the application, the instrumentation data tracked from an electronic client module; and
    aggregate the instrumentation data into a funnel, the funnel including a hierarchical-ordered path of actions taken by multiple users in adoption of the application, the funnel including one or more stages, each user action associated with at least one stage of a funnel.

16. The device of claim 15, wherein the at least one processor is further configured to:
    configure a funnel report to represent a particular age group of users or a particular geographic region of users.

17. The device of claim 15, wherein the at least one processor is further configured to:
    configure the funnel to include user actions representing one or more of:
    user actions that opt in for a trial of the application;
    user actions that take a license to the application;
    user actions that install the application;
    user actions that uninstall the application; and
    user actions taken in purchasing goods or service offered during execution of the application.

18. The device of claim 15, wherein the at least one processor is configured to:
   track status of licenses for the application; and
   aggregate the status of the licenses into the funnel.

19. The device of claim 15, further wherein the at least one processor is configured to:
   receive a second set of instrumentation data, the second set of instrumentation data including references to the application from a referral source; and
   aggregate the second set of instrumentation data into the funnel.

20. The device of claim 15, wherein the at least one processor is configured to:
   track purchases of goods and services offered from the electronic store; and
   aggregate the purchases of the goods and services into the funnel.

\* \* \* \* \*